J. A. RAY.
WATER PURIFIER AND BOILER CLEANER.
APPLICATION FILED JAN. 4, 1910.
968,077.
Patented Aug. 23, 1910.
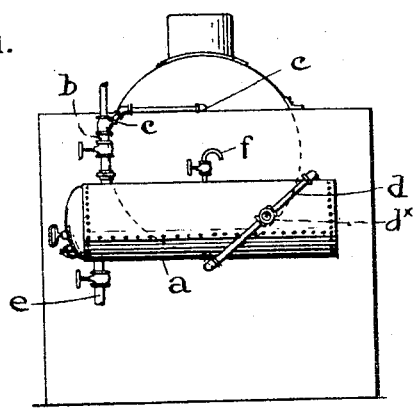
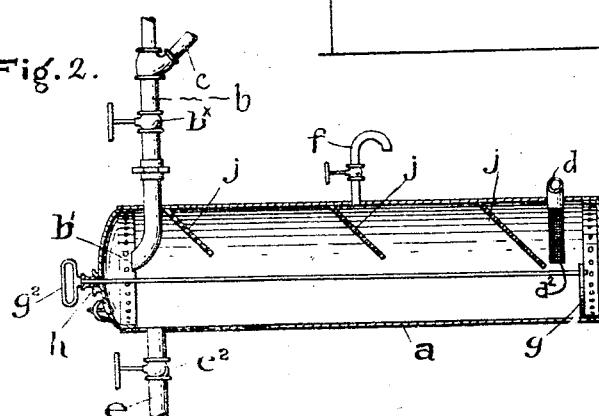
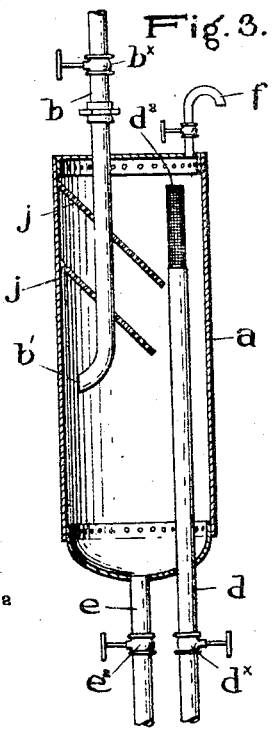
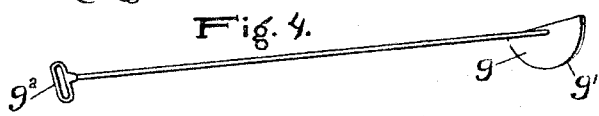
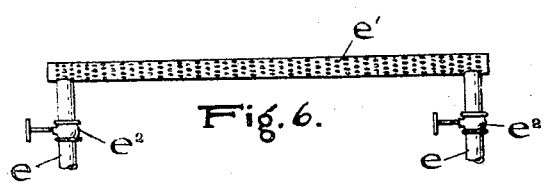
Witnesses
Stuart Hilder.
Frances M. Anderson
Inventor
James A. Ray.
by E. W. Anderson & Son
his Attorneys

UNITED STATES PATENT OFFICE.

JAMES A. RAY, OF KANSAS CITY, MISSOURI.

WATER-PURIFIER AND BOILER-CLEANER.

968,077.  Specification of Letters Patent.  Patented Aug. 23, 1910.

Application filed January 4, 1910. Serial No. 536,427.

*To all whom it may concern:*

Be it known that I, JAMES A. RAY, a citizen of the United States, resident of Kansas City, in the county of Jackson and State of Missouri, have made a certain new and useful Invention in Water-Purifiers and Boiler-Cleaners; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to water purifiers and boiler cleaners, having for its object the provision of improved means for preventing the formation of scale and the deposit of sediment in steam boilers by purifying the feed water before it enters the boiler, thereby eliminating foreign matters, which are deposited in my water purifying tank instead of in the boiler, and from whence they may be readily removed without interfering with the operation of the boiler and without loss of heat.

The invention consists in the novel construction and combinations of parts as hereinafter set forth.

In the accompanying drawings, illustrating the invention, Figure 1 is a side view of the invention as applied to a return tubular boiler; Fig. 2 is a central vertical section of the water purifying tank; Fig. 3 is a similar view of the vertical form of my water purifying tank, designed to save space; Fig. 4 is a detail perspective view of the scraper device; Fig. 5 is a detail view of one of the baffle plates; and Fig. 6 is a detail view of the blow off pipe.

In these drawings the letter $a$, designates a cylinder drum or shell located adjacent to the steam boiler and forming a water purifying tank for the boiler feed water, and in which the impurities removed from such water are deposited as hereinafter set forth.

$b$, is the pipe for feeding water to the water purifying tank, having a branch pipe $c$, provided with a boiler connection just above the flues and below the water level, as shown at $c'$. This pipe $b$, has an elbow or curved end portion $b'$, located within the tank, toward the wall of which it is directed, and designed to deflect the entering water against the tank wall, causing an eddy to form, breaking the force of the pump or injector and facilitating the settling of sediment.

$d$, is the outlet pipe from said tank, having a boiler connection for feeding the water thereto. This outlet boiler feed pipe has a perforated or strainer end portion located within the tank and designed to prevent foreign matter from passing to the boiler and the formation of any strong current, which would disturb the sediment. The end of this filter is open, as shown at $d^2$, so that it is not possible for it to choke.

$e$, is a blow off pipe, a valve $e^2$, being provided in the pipe $e$, and valves $b^x$, and $d^x$, in the pipes $b$, and $d$.

$f$, is a valved pipe for drawing off oil from the tank and making tests of the water therein.

In the bottom of the horizontal form of tank, as shown in Fig. 2 of the drawings, a scraper $g$, is provided, having an arc-form lower edge $g'$, conforming to the cylindrical surface of the tank, and a handle connection $g^2$, engaging a stuffing box $h$, in the end wall of the tank.

In the upper portion of the tank is provided a series of perforated baffles or filter plates $j$, $j$, located at intervals and separated from each other, the baffle or filter plate nearest the inlet water pipe $b$, having fairly large perforations, the next filter plate toward the outlet pipe $d$, having smaller perforations, and the next filter plate toward or nearest the pipe $d$, (where three filter plates are provided, as shown in the horizontal tank, see Fig. 2) having still smaller perforations, so as to prevent any foreign matter from passing out of the tank to the boiler. These baffle or filter plates are placed in the upper portion of the tank for the reason that the hot water taken from the boiler by branch pipe $c$, mixing with the feed water as it enters the tank, raises the water temperature to such an extent that the water circulation is along the upper portion of the tank, and but for the baffle or filter plates the water would tend to pass out of the tank and into the boiler without remaining in the tank sufficiently long for proper precipitation of the impurities. These baffle or filter plates are placed each at an angle or incline, and allow steam and water to pass therethrough, while the passage of the foreign matters is obstructed, such matters being deflected toward the bottom of the tank and ultimately blown or scraped out therefrom.

In the use of my invention water admitted to the water purifying tank from a high pressure boiler raises the temperature of the feed water with which it mingles to the precipitating point for all impurities, no reagent in this case being required. With low pressure boilers when required the reagent or reagents, compounded in the proper ratio, are mixed with the feed water before or as it enters the water purifying tank, causing immediate reaction and precipitation of the impurities in such tank, the reaction being accelerated and intensified by the heat of the boiler water and steam admixture. It is thus designed to render impossible the presence of any suspended foreign matters in the water circulation of the purifying tank, and consequent passage from said tank to the boiler, such foreign matters gravitating to the bottom of the tank, from whence they may be removed when required by closing the valves of the inflow pipe $b$, and outlet pipe $d$, and opening the valve of the blow off pipe, and the use of the scraper.

In some cases, as shown in Fig. 6 of the drawings the blow off pipe $e$ may have connection with a perforated pipe $e'$ located in the bottom portion of the water purifying tank.

Having thus described my invention, what I claim as new and desire to secure by Letters Patent is:

1. Water purifying means for use with steam boilers, including a tank provided with a water inflow pipe, a water outflow pipe, and a series of strainer baffle plates located in the upper portion of said tank between said inflow pipe and said outflow pipe.

2. Water purifying means for use with steam boilers, including a tank provided with a water inflow pipe having a curved end portion adjacent to and directed toward a wall of the tank, a water outflow pipe, and a strainer baffle plate located in the upper portion of said tank between said inflow pipe and said outflow pipe.

3. Water purifying means for use with steam boilers, including a tank provided with a water inflow pipe, a water outflow pipe, and a series of inclined strainer baffle plates located in the upper portion of said tank between said inflow pipe and said outflow pipe and having respectively perforations of gradually decreasing size.

4. Water purifying means for use with steam boilers, including a tank provided with a water inflow pipe having a curved end portion adjacent to and directed toward a wall of the tank, a water outflow pipe, and a series of inclined strainer baffle plates of gradually increasing size located in the upper portion of said tank between said inflow pipe and said outflow pipe and having respectively perforations of gradually increasing size.

In testimony whereof I affix my signature, in presence of two witnesses.

JAMES A. RAY.

Witnesses:
HENRY S. CONRAD,
THAD B. LANDON.